(12) United States Patent
Blanding et al.

(10) Patent No.: US 8,024,737 B2
(45) Date of Patent: Sep. 20, 2011

(54) METHOD AND A SYSTEM THAT ENABLES THE CALCULATION OF RESOURCE REQUIREMENTS FOR A COMPOSITE APPLICATION

(75) Inventors: William H. Blanding, Nashua, NH (US); Manosiz Bhattacharyya, San Jose, CA (US); Jerry James Harrow, Jr., Nashua, NH (US); Glenna Mayo, Cupertino, CA (US); David Isaiah Seidman, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1536 days.

(21) Appl. No.: 11/410,471

(22) Filed: Apr. 24, 2006

(65) Prior Publication Data

US 2007/0250629 A1     Oct. 25, 2007

(51) Int. Cl.
*G06F 9/46*     (2006.01)
*G06F 15/173*     (2006.01)

(52) U.S. Cl. ......... 718/104; 709/224; 709/225; 709/226

(58) Field of Classification Search .................. 718/104; 709/224–226
See application file for complete search history.

(56) References Cited

U.S. PATENT DOCUMENTS

| 7,774,791 | B1 * | 8/2010 | Appelbaum et al. | 719/318 |
| 2002/0184402 | A1 * | 12/2002 | Gangopadhyay | 709/315 |
| 2005/0149940 | A1 * | 7/2005 | Calinescu et al. | 718/104 |
| 2005/0193115 | A1 * | 9/2005 | Chellis et al. | 709/226 |
| 2007/0240111 | A1 * | 10/2007 | Britton et al. | 717/120 |

* cited by examiner

*Primary Examiner* — Kenneth Tang (57) ABSTRACT

Embodiments of the present invention that pertain to methods and systems for the calculation of resource requirements for a composite application are described. In one embodiment, information describing what component applications are associated with the composite application is received. Information describing metrics that are to be measured for the component applications is received. Information describing interrelationships between the component applications associated with the composite application is received. Information describing rules for calculating the resource requirements for the component applications is received. The rules are based on the interrelationships between the component applications and the metrics that are to be measured.

20 Claims, 4 Drawing Sheets

METHOD AND A SYSTEM THAT ENABLES THE CALCULATION OF RESOURCE REQUIREMENTS FOR A COMPOSITE APPLICATION

TECHNICAL FIELD

Embodiments of the present invention relate to determining resource requirements of applications. More specifically, embodiments of the present invention relate to enabling the calculation of resource requirements for a composite application.

BACKGROUND

In today's environment, resources such as processors, memory, and firewalls, among other things, are dynamically allocated (also commonly known as "provisioned") to applications when a need for the resources arises. For example, a large application for providing Internet services may include several smaller applications, such as web server applications, intermediate server applications and one or more database managers. A user interacting with the Internet may request to see a webpage. A web server application will receive the request to display the web page, then an intermediate application server will receive the request and finally data may be obtained from the database manager in order to display the web page.

Conventional workload management software is used for determining how resources are to be dynamically allocated to applications. Since the application executing on the web server is the first application to receive the request for the web page, the conventional workload management software will detect that the demand for the web server application has increased. The conventional workload management software will allocate additional resources to the application executing on the web server in order to satisfy its increased demand for resources. In order to provide these additional resources to the web server application, resources may be taken away from other parts of the system, such as one of the intermediate server applications or the database manager.

Then the demand on the application executing on the intermediate application servers will increase. So the conventional workload management server will allocate additional resources to the application executing on the intermediate servers. The resources allocated to the intermediate server application may be taken away from other parts of the system, such as one of the web server applications or the database manager. Finally, the demand on the database manager will increase, so the conventional workload management software will allocate additional resources to the database manager. The resources allocated to the database manager may be taken away from other parts of the system, such as one of the web server applications or one of the intermediate server applications.

In the meantime, the user is waiting to see their web page and will become impatient. The user may impatiently start to click on buttons which only increases the demand on the applications (e.g., web server applications, intermediate server applications, and the database manager) and therefore increases the need for more resources and the moving of resources around. Therefore, conventional workload management software is not able to adequately allocate resources.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale unless specifically noted.

DETAILED DESCRIPTION OF THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

OVERVIEW

Conventional workload management software makes resource allocation decisions for individual component applications without regard to the interrelationships between the various individual component applications. In contrast, according to embodiments of the present invention, the interrelationships between individual component applications that belong to a composite application are taken into consideration in making resource allocation decisions.

Figure 1:
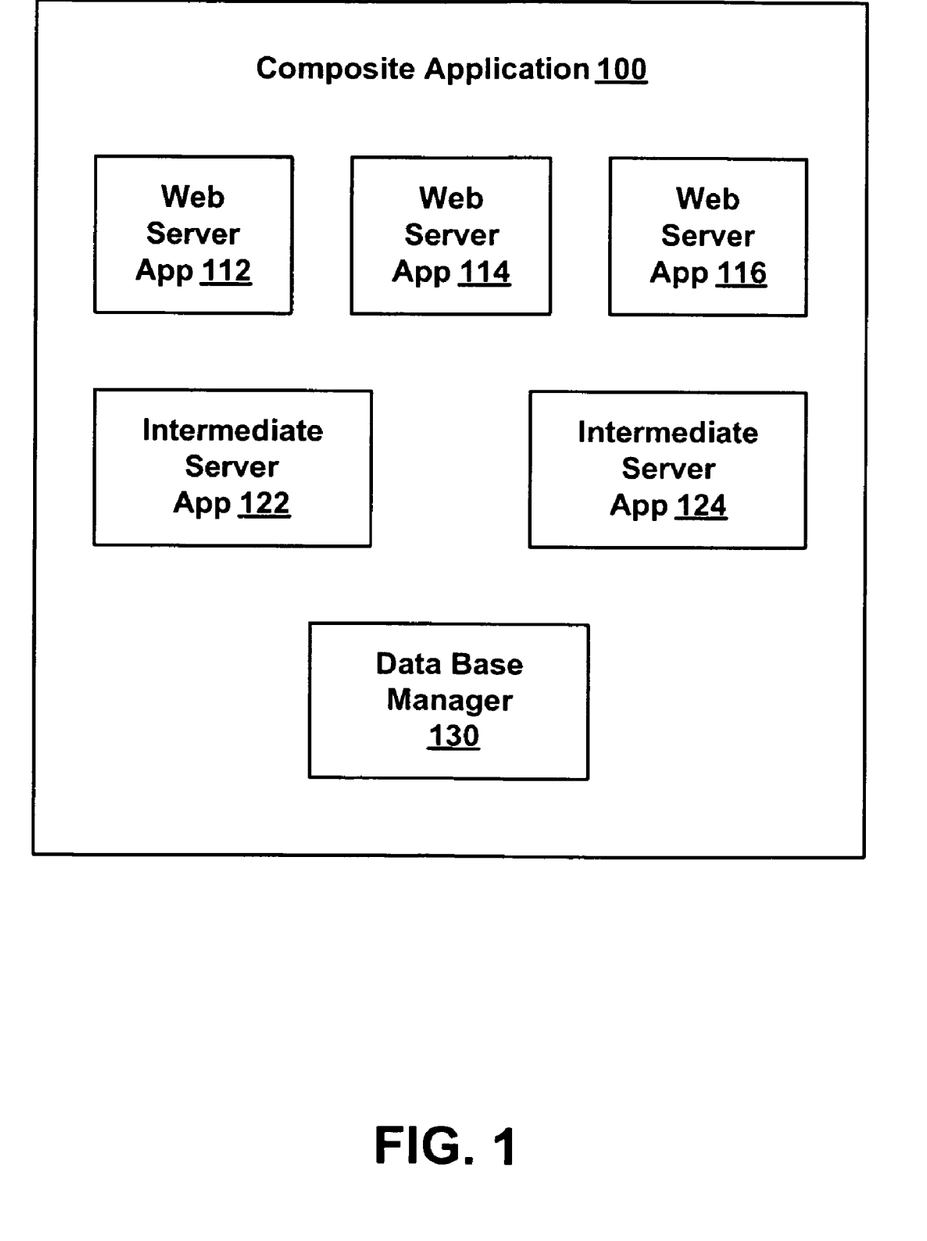
FIG. 1 is a block diagram of a composite application that includes a plurality of component applications, according to embodiments of the present invention.

FIG. 1 is a block diagram of a composite application that includes a plurality of component applications, according to embodiments of the present invention. As depicted in FIG. 1, the composite application 100 provides Internet services. The composite application includes several web server applications (112, 114, and 116) two intermediate server applications (122 and 124) and a database manager 130. According to embodiments of the present invention, the interrelationships between the component applications (112, 114, 116, 122, 124, and 130) associated with a composite application 100 can be determined, as will become more evident. Further, a determination is made as to what types of metrics are to be measured for each of the component applications (112, 114, 116, 122, 124, and 130) associated with a composite application 100. Types of metrics that can be measured are: CPU utilization, throughput, amount of data transferred, amount of data stored, and etc. Measurements for these metrics are calculated periodically for the component applications (112, 114, 116, 122, 124, and 130). For example, if a metric for CPU utilization is associated with the component application 114, then the CPU utilization for component application 114 is periodically measured. Rules are used for calculating the resource requirements of the component application 114. For example, in one embodiment, a rule indicates that if the CPU utilization is below a target value for the component application 114, then processors can be de-allocated from that component application 114 without negatively impacting the performance of component application 114.

In some embodiments of the present invention, interrelationships between individual component applications (112, 114, 116, 122, 124, and 130) that belong to a composite application 100 are taken into consideration. In some such embodiments, resources will not be allocated or de-allocated from related component applications (112, 114, 116, 122, 124, and 130) unless measurements from those component applications (112, 114, 116, 122, 124, 130) so dictate. For example, in some embodiments, the present invention is used to identify that the intermediate server applications (122 and 124) and the database manager 130 will need more resources when the web server applications (112, 114, and 116) need more resources. Using measurements from related component applications (112, 114, 116, 122, 124, and 130) enables a more proactive or anticipatory approach to resource management. In such a proactive approach, a resource can be allocated to a component application in anticipation of the component application needing the resource. Further, composite application 100's lack of resources for one component application may be manifested as deficient behavior in other component applications.

In some embodiments of the present invention, allocating resources to one component application (112, 114, 116, 122, 124, or 130) exhibiting deficient behavior may not improve the overall performance of the composite application 100 unless resources are also allocated to other component applications (112, 114, 116, 122, 124, and/or 130) associated with the composite application 100. For example, embodiments of the present invention can be used to identify that the intermediate server applications (122 and 124) and the database manager 130 will need more resources when the web server applications (112, 114, and 116) needs more resources. If the demand on the web server applications (112, 114, and 116) increases then the demand on the intermediate server applications 122, 124 and the database manager 130 will also increase.

In one embodiment of the present invention, composite application 100 depicted in FIG. 1 is for Internet services. However, it is appreciated that in other embodiments of the present invention, a composite application can be for any type of software application, such as: billing, payroll, testing, medical applications, warehouse applications, inventory applications, and etc. Although the composite application 100 depicted in FIG. 1 depicts several web server applications (112, 114, and 116), two intermediate server applications (122 and 124) and only one database manager 130, it is appreciated that a composite application of the present invention may include any number of web server applications, intermediate server applications, data base managers, or any other applications.

Resources

Resources can be any component that is hardware, software, firmware, or combination thereof that can be used to provide services rendered by an application, as will become more evident. For example, in various embodiments of the present invention, the resources can be: servers, firewalls, load balancers, data backup devices, arrays of data storage disks, network appliances, Virtual Local Area Networks (VLANS), and Network Interface Cards (NICs), among other things.

Component Applications

According to one embodiment of the present invention, individual component applications are comprised of groups of processes executing in a single operating system instance. Examples of component applications include, but are not limited to: web server applications, intermediate server applications for generating web pages, database managers for supplying data to the intermediate server applications, and so on.

Composite Application

According to one embodiment of the present invention, a composite application includes a group of related component applications that execute on the same or different operating system instances and that intercommunicate to accomplish some common purpose. The topology or structure of a composite application also includes the relationships or interactions between the component applications associated with the composite application, according to one embodiment.

It is not necessarily the case that all of the component applications associated with a component application share the same set of resources. This is because the component applications frequently execute on separate computer systems which could be subdivided. Additionally, in one embodiment, composite applications share resources, for example, with other composite applications.

Workload Management

Workload management is a repetitive procedure for determining the resources required (also referred to herein as "resource requirements") by component applications and in turn a composite application. According to one embodiment of the present invention, the resources required are those needed in order to provide adequate performance, monitoring the availability of such resources, allocating resources to the various applications according to the determined requirements and reassigning the resources according to the allocation. In managing resources, resources can be allocated to various component applications or de-allocated from various component applications. Further, resources can be moved. For example, a processor may be de-allocated from one component application that is capable of performing adequately without the processor and the allocated to another component application that is under performing.

Conventional workload management systems do not allocate resources with a view of the composite application. Conventional workload management systems only take into consideration each component application separately. This results in an inefficient use of resources. In contrast, embodiments of the present invention take into consideration the interrelationships between the component applications in a composite application. This approach allows for allocating the resources where they are most needed.

Metrics

Metrics, according to one embodiment of the present invention, are kinds of measurements which may be performed on computing systems or their components and which may be associated with the operation of computer software, in particular component applications. Examples of metrics that can be associated with component applications and measured include, but are not limited to: central processing unit (CPU) utilization; memory utilization; throughput (indication of Input/Output (I/O) bandwidth); and amount of data stored on memory, such as that provided by mass storage devices.

According to embodiments of the present invention, a metric associated with one component application may be dependent on one or more metrics associated with other component applications. For example, the CPU utilization of a database manager may be dependent on the CPU utilization of a web server application. In another example, the CPU utilization for a web server application and the memory utilization for a database manager are metrics for the intermediate server application. More specifically, a user interface may allow an operator to specify that the metrics for the intermediate server application 122 are: CPU utilization of web server application 114; and memory utilization of database manager 130. These are just some examples of a metric associated with one component application being dependent on the metrics associated with other component applications.

According to embodiments of the present invention, interaction between the measurements of metrics for component applications is not needed. Further, the interrelationship between the component applications is not needed in order to calculate the measurements of metrics, according to embodiments of the present invention. The measurements of the metrics can be performed on the basis of individual component applications and be combined, for example, when resource allocation is being performed.

Relationships

By taking relationships between component applications into account, embodiments of the present invention make better predictions as to how component applications interoperate. Relationships may be defined automatically or manually. For example, in the first case, a software system could track the invocations between component applications to determine which component applications are associated with a composite application and how the component applications are related. In the second case, an operator may enter the names of (or some how identify) the component applications that are associated with a composite application into a user interface.

Relationships can be determined directly or indirectly, according to embodiments of the present invention. In one embodiment, for example, relationships are determined directly by receiving information entered by an operator which indicates that one component application has a relationship to another component application. More specifically, information can be received indicating that intermediate server application 122 has a relationship to web server application 114 and has a relationship to the database manager 130.

In one embodiment, relationships can be determined indirectly from the metrics that are specified. For example, as already described herein, a metric associated with one component application may be dependent on one or more metrics associated with other component applications. An example of this, which has already been described herein, is specifying that the CPU utilization for the web server application 114 and the memory utilization for the database manager 130 are metrics for the intermediate server application 122.

Rules

According to embodiments of the present invention, rules are provided for calculating the resource requirements for the component applications. For example, a rule may indicate that if the CPU utilization is below a target value for a particular component application, then processors can be de-allocated from that component application without negatively impacting that component application's performance.

In another example, the operator may enter a rule indicating that X number of processors would provide intermediate server application 122 with a certain level of CPU utilization. In this case, the specified level of CPU utilization is a "target value." If the CPU utilization for intermediate server application 122 is below the target value, then processors can be re-allocated from intermediate server application 122 without negatively affecting the performance of intermediate server application 122. In this case, the surplus processors may be moved from intermediate server application 122 to another component application that is in need of additional processors in order to satisfy that component applications rule for CPU utilization. If the CPU utilization of intermediate server application 122 falls below the target value, then processors cannot be de-allocated from intermediate server application 122 without negatively affecting the performance of intermediate server application 122. In this case, processors may be de-allocated from another component application and allocated to intermediate server application 122. Note that the movement of resources is not usually restricted to components of the same composite application.

A rule, according to one embodiment, is expressed as a mathematical formula. Consider, for example, a rule that, "the number of processors allocated to a web server application is adequate as long as the CPU utilization for web server application 114 is less than the target value 60%." In one embodiment of the present invention, the corresponding formula for this rule may be, "CPU utilization for web server application 114<60%"

Figure 2:
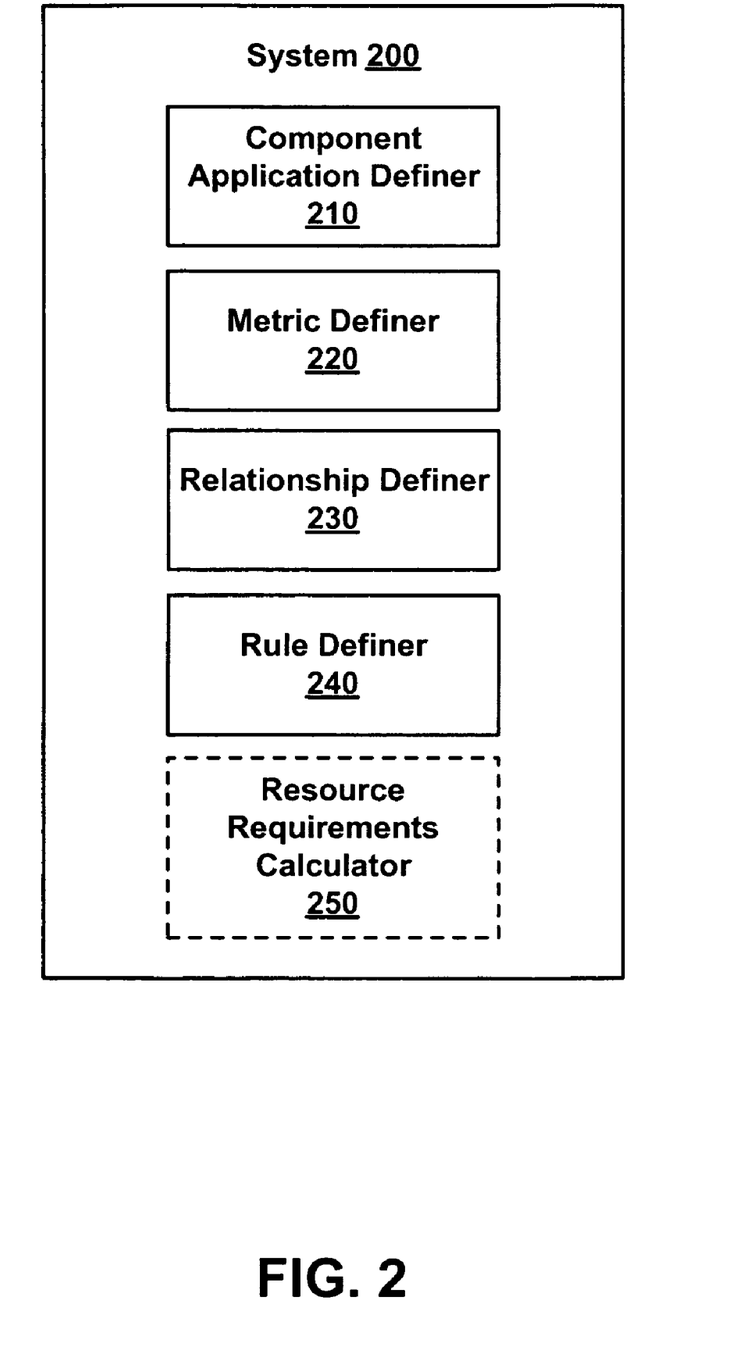
FIG. 2 is a block diagram of a system that enables the calculation of resource requirements for a composite application, according to embodiments of the present invention.

A System that Enables the Calculation of Resource Requirements for a Composite Application FIG. 2 is a block diagram of a system that enables the calculation of resource requirements for a composite application, according to embodiment of the present invention. The blocks that represent features in FIG. 2 can be arranged differently than as illustrated, and can implement additional or fewer features than described herein. Further, the features represented by the blocks in FIG. 2 can be combined in various ways.

As depicted in FIG. 2, the system includes a component application definer 210, a metric definer 220, a relationship definer 230, a rule definer 240, and an optional resource requirements calculator 250, according to one embodiment. For example, component application definer 210 receives information describing what component applications are associated with the composite application. Metric definer 220 receives information describing metrics that are to be measured for the component applications. Relationship definer 230 receives information describing interrelationships between the component applications associated with the composite application, and rule definer 240 receives information describing rules for calculating the resource requirements for the component applications, wherein the rules are based on the interrelationships between the component applications and the measurements of the metrics.

System 200 includes a resource requirements calculator 250 for calculating the resource requirements for the component applications, for example, based on the measurements and the rules, among other things. According to one embodiment, the resource requirements calculator 250 is determined by the definers 210, 220, 230, and 240. The resulting resource requirements calculator may then function as a component of a Workload Manager. According to one embodiment, the resource requirements calculator 250 generates resource requirements for component applications at the request of the Workload Manager, which then uses these requirements in allocating and reassigning resources. According to one embodiment, measurements of the metrics are re-calculated periodically. For example, the measurements of the metrics for each of the component applications may be determined every ten to fifteen seconds. The period of time that the measurements are re-calculated may be configured into system 200. In turn, according to another embodiment, resource requirements calculator 250 periodically re-calculates the resource requirements based on the re-calculated measurements.

According to one embodiment, metrics, rules, relationships, and the identification of component applications associated with a composite application, among other things, can be entered directly into system 200 or selected, for example from pre-defined lists. System 200 provides a user with a way of expressing their knowledge of how a composite application works, according to embodiments of the present invention.

Figure 3:
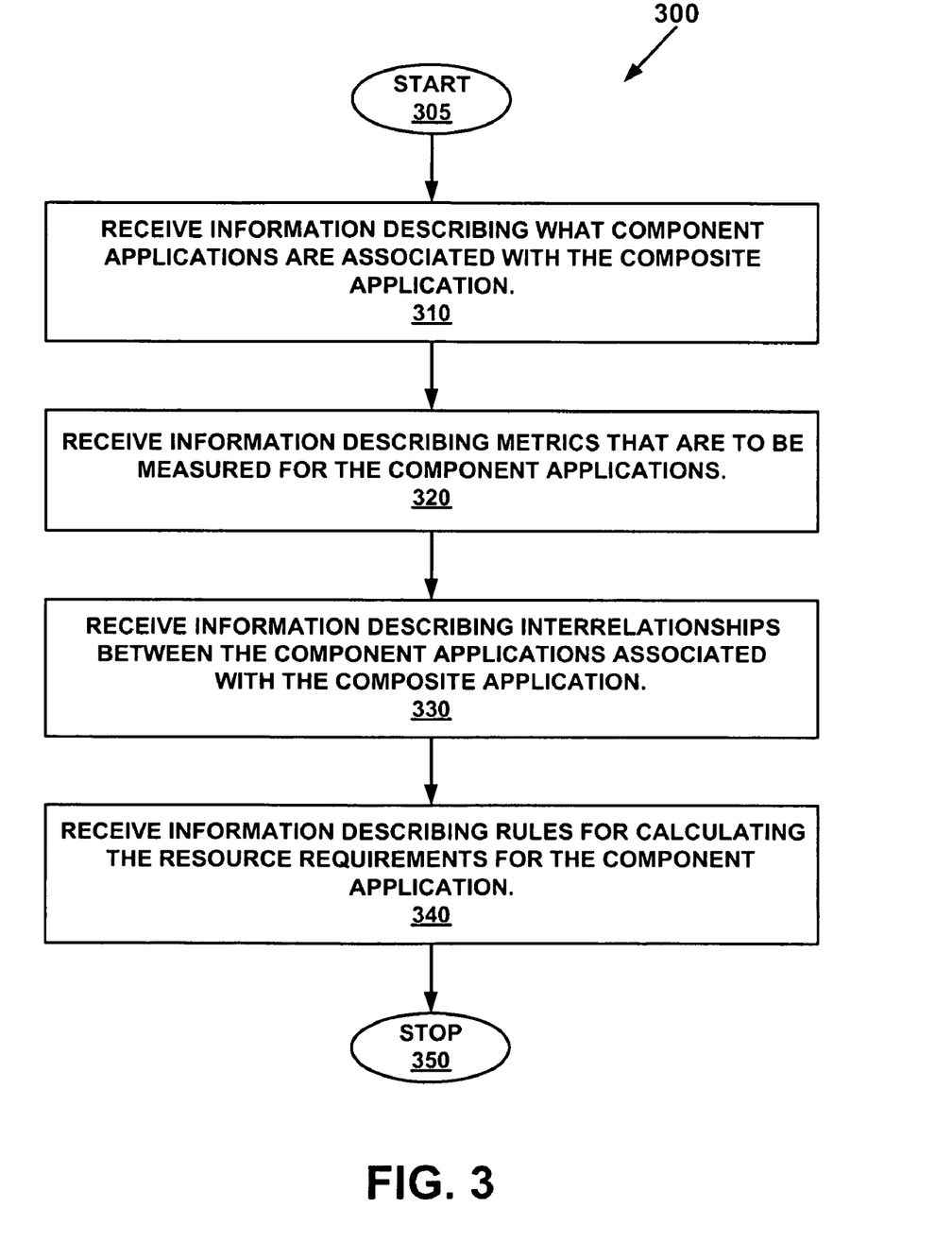
FIG. 3 depicts a flowchart for a method of enabling the calculation of resource requirements for a composite application, according to embodiments of the present invention.

Operational Example of a Method that Enables the Calculation of Resource Requirements for a Composite Application FIG. 3 depicts a flowchart 300 for a method of enabling the calculation of resource requirements for a composite application 100, according to embodiments of the present invention. Although specific steps are disclosed in component flowchart 300, such steps are exemplary. That is, embodiments of the present invention are well suited to performing various other steps or variations of the steps recited in component flowchart 300. It is appreciated that the steps in component flowchart 300 may be performed in an order different than presented, and that not all of the steps in component flowchart 300 may be performed. All of, or a portion of, the embodiments described by component flowchart 300 can be implemented using computer-readable and computer-executable instructions which reside, for example, in computer-usable media of a computer system or like device. The instructions, according to one embodiment, are executed by a computer processor associated with the computer system, or like device, that accesses the instructions stored on the computer-usable media.

For the purposes of illustration, the discussion of component flowchart 300 shall refer to the structures depicted in FIG. 1 and FIG. 2.

The process starts at step 305

In step 310, according to embodiments of the present invention, information describing what component applications are associated with composite application 100 (FIG. 1) is received. For example, an operator can use system 200 (FIG. 2) to enter the names of the component applications (112, 114, 116, 122, 124, and 130 (all of FIG. 1)) for the web server applications (112, 114, and 116), the intermediate server applications (122 and 124) and the data base manager 130 associated with the composite application 100. The component application definer 210 can receive the names of the component applications (112, 114, 116, 122, 124, and 130) that the operator entered.

In step 320, according to embodiments of the present invention, information describing metrics that are to be measured for the component applications is received. For example, the operator may enter metrics for intermediate server application 122. In this operational example, assume that the metrics for the intermediate server application 122 are: CPU utilization of web server application 114; and memory utilization of database manager 130. Metric definer 220 receives the metrics that the operator entered for intermediate server application 122.

In step 330, according to embodiments of the present invention, information describing interrelationships between the component applications associated with composite application 100 is received. According to embodiments of the present invention, the interrelationships between component applications can be determined directly or indirectly. In this operational example, the relationships are determined indirectly. For example, a relationship between intermediate server application 122 and web server application 114 can be determined indirectly based on the fact that the one of the metrics for intermediate server application 122 is "CPU utilization of intermediate server application 122." Further, a relationship between intermediate server application 122 and database manager 130 can be determined indirectly based on the fact that another metric for intermediate server application 122 is "memory utilization of database manager 130."

In step 340, according to embodiments of the present invention, information describing rules for calculating the resource requirements for the component applications is received, wherein the rules are based on the interrelationships between the component applications and the metrics that are to be measured. For example, the operator may enter a rule indicating that X number of processors would provide intermediate server application 122 with a certain level of CPU utilization. In this case, the specified level of CPU utilization is a "target value." If the CPU utilization for intermediate server application 122 is below the target value, then processors can be re-allocated from intermediate server application 122 without negatively affecting the performance of intermediate server application 122. In this case, the surplus processors may be moved from intermediate server application 122 to another component application that is in need of additional processors in order to satisfy that component application's rule for CPU utilization. If the CPU utilization of intermediate server application 122 is above the target value, then processors cannot be de-allocated from intermediate server application 122 without negatively affecting the performance of intermediate server application 122. In this case, processors may be de-allocated from another component application and allocated to intermediate server application 122.

The process stops at step 350

According to one embodiment, the information received in steps 310, 320, 330, and 340 is received by a resource requirements calculator 250, which uses the received information to calculate resource requirements. According to another embodiment, the information received in steps 310, 320, 330, and 340 is used to create, for example, by generating software instructions, a resource requirements calculator 250. The resource requirements calculator 250 which results from this process then may be used as a component of a Workload Manager, according to one embodiment.

Figure 4:
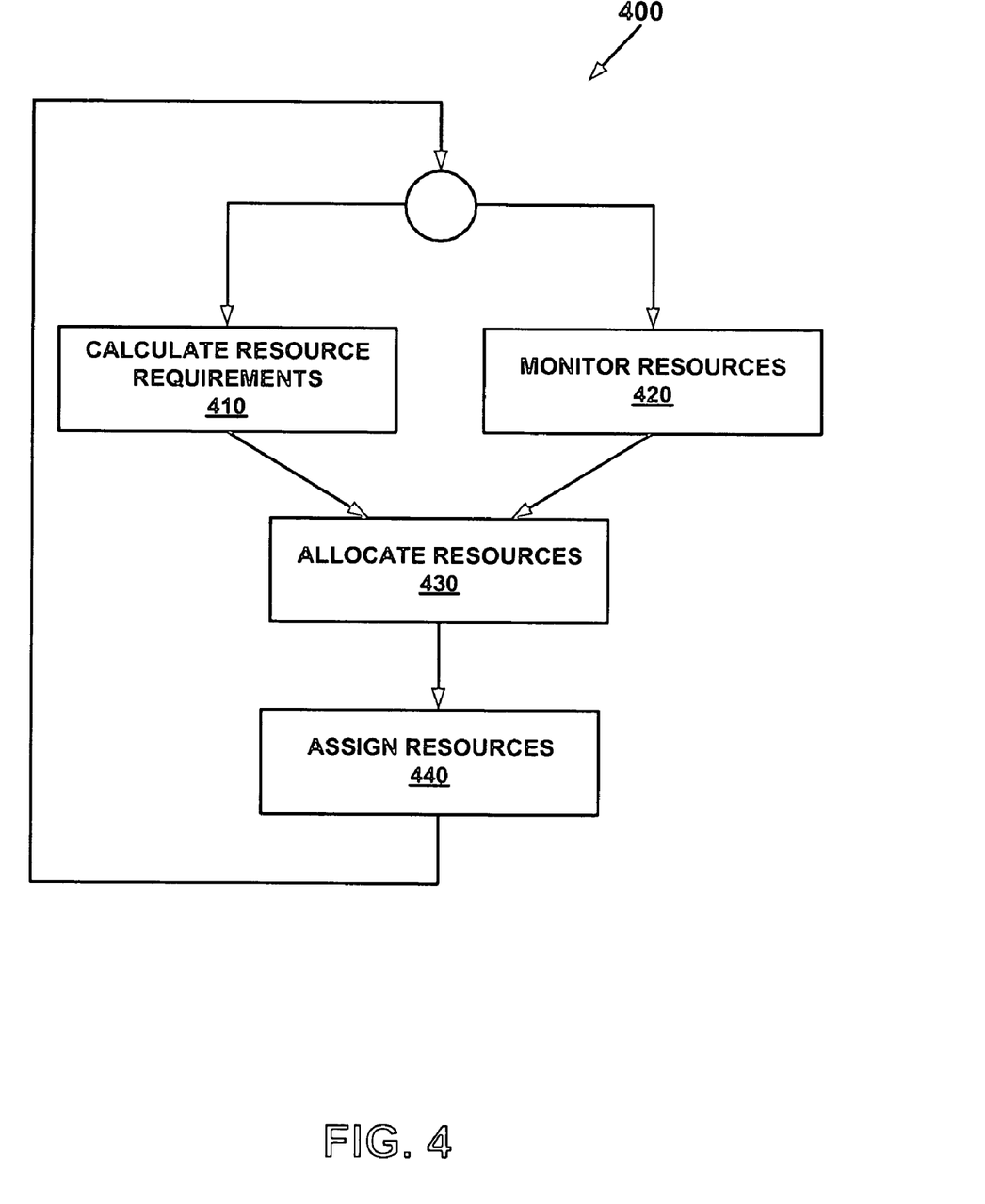
FIG. 4 depicts a flowchart showing the interaction of components of a Workload Manager, according to one embodiment of the present invention.

FIG. 4 depicts a flowchart showing the interaction of components of a Workload Manager, according to one embodiment. According to one embodiment, a workload manager comprises: a resource requirements calculator 250, a resource availability monitor, a resource allocator and a resource assigner. In this embodiment, the calculator 250, the monitor, the allocator and the assigner interoperate repetitively to determine available resources and component application resource requirements, allocate available resources to component applications, and reassign resources to component applications according to the allocation. For example, referring to FIG. 4, at steps 410 and 420 respectively, the calculator 250 and the monitor can operate in parallel.

The resource allocator at step 430 determines how to allocate resources. At step 440, the resource assigner assigns resources based on the determinations made by the resource allocator in step 430. Then the process as depicted in flowchart 400 repeats by returning to steps 410 and 420.

More specifically, with regard to the resource requirements calculator 250, measurements are made for the metrics associated with the component applications. The rules and the measurements can be used for calculating the resource requirements. More specifically, since the CPU utilization of web server application 144 is a metric for intermediate server application 122 in this operational example, the CPU utilization of web server application 114 will be periodically measured. The appropriate rules will then use that measurement to determine the resource requirements for intermediate server application 122, for example.

The measurements for the metrics can be periodically re-calculated and used to re-calculate the resource requirements. For example, periodically, such as every 10 seconds, the CPU utilization of web server application 114 can be re-calculated based on web server application's current workload. The current measurement for web server application 114's CPU utilization can be used to re-calculate the resource requirements for intermediate server application 122 based on the appropriate rules. This process of re-calculating the CPU utilization and the resource requirement can be repeated every 10 seconds, for example.

CONCLUSION

Although conventional workload management software may associate metrics with component applications, conventional workload management software does not take into consideration the relationships between the component applications for calculating resource requirements. Although conventional workload management software may take into consideration interactions between more than one metric associated with one component application, conventional workload management software does not take into consideration the interaction between metrics associated with different component applications. For example, conventional workload management software may take into account that the memory utilization for component application A may increase when the CPU utilization for component A increases. However, conventional workload management software does not take into account that the CPU utilization or memory utilization of component application B may increase when the CPU utilization of component application A increases.

Conventional workload management software does not take into consideration relationships between component applications that are associated with a composite application. Therefore, conventional workload management software cannot anticipate the resource requirements that will be needed by various component applications associated with a composite application. For example, conventional workload management software cannot anticipate that the intermediate server applications demand for resources will increase when the workload of the web server applications increases. However, according to embodiments of the present invention, a system 200 (FIG. 2) enables anticipation that the intermediate server applications will need more resources when the workload of the web server application increases by taking into account the interrelationships between the web server application and the intermediate server application, among other things.

According to embodiments of the present invention, the resource allocation for workload management is more responsive than when the structure of a composite application is not considered. For example, when the operating conditions for a composite application changes and a need for updating resource allocation is detected for one component application, resource adjustments can be made for other component applications at the same time, instead of waiting for the effects of the operating environment change to propagate through all of the component applications. As a result, resource utilization will be more efficient since resources can be more quickly released when operating conditions so dictate and application performance will improve over that provided by conventional workload management software, since resources can be pro-actively allocated.

What is claimed is:

1. A method of enabling the calculation of resource requirements for a composite application, the method comprising:
   receiving information describing which component applications are associated with the composite application;
   receiving information describing metrics that are to be measured for the component applications;
   receiving information describing interrelationships between the component applications associated with the composite application; and
   receiving information describing rules for calculating the resource requirements for the component applications, wherein the rules are based on interrelationships between the component applications and the metrics that are to be measured, and wherein at least one of said rules indicates that if a central processing unit utilization metric is below a target level for a particular component application then at least one processor may be de-allocated from the particular component application without negatively impacting performance of the particular component application.

2. The method as recited in claim 1, wherein the method further comprises:
   calculating measurements based on the metrics.

3. The method as recited in claim 1, wherein the method further comprises:
   calculating the resource requirements for the component applications based on interrelationships between the component applications and the measurements of the metrics.

4. The method as recited in claim 3, wherein the method further comprises:
   re-calculating the measurements periodically and using the rules to re-recalculate the resource requirements based on re-recalculation of the measurements.

5. The method as recited in claim 1, wherein said receiving information describing metrics that are to be measured for the component applications further comprises:
   receiving metrics selected from a group consisting of:
      central processing unit (CPU) utilization, memory utilization, throughput, and amount of data stored on memory.

6. The method as recited in claim 1, wherein the step of receiving information describing rules further comprises:
   receiving the rules in the form of formulas that specify mathematical relationships of a metric to a target value.

7. The method as recited in claim 1, wherein the method further comprises:

receiving information describing metrics that indirectly specify relationships between component applications; and determining the relationships based on the metrics.

8. A system for enabling the calculation of resource requirements for a composite application, the system comprising:

a computer processor;

a component application definer for receiving information describing component applications that are associated with the composite application;

a metric definer for receiving information describing metrics that are to be measured for the component applications;

a relationship definer for receiving information describing interrelationships between the component applications associated with the composite application; and a rule definer for receiving information describing rules for calculating the resource requirements for the component applications, wherein the rules are based on the interrelationships between the component applications and the measurements of the metrics, and wherein at least one of said rules received by said rule definer indicates that if a central processing unit utilization metric is below a target level for a particular component application then at least one processor may be de-allocated from the particular component application without negatively impacting performance of the particular component application.

9. The system of claim 8, wherein the system further comprises:

a resource requirements calculator for calculating the measurements based on the metrics.

10. The system of claim 8, wherein the system further comprises:

a resource requirements calculator for calculating the resource requirements for the component applications based on the interrelationships between the component applications and the measurements of the metrics.

11. The system of claim 10, wherein:

the resource requirements calculator re-calculates the measurements periodically and uses the rules to re-recalculate the resource requirements based on the re-recalculation of the measurements.

12. The system of claim 8, wherein:

the metric definer receives information describing metrics selected from a group consisting of:

central processing unit (CPU) utilization, memory utilization, throughput, and amount of data stored on memory.

13. The system of claim 8, wherein:

the rule definer receives information describing the rules in the form of formulas that specify mathematical relationships of a metric to a target value.

14. The system of claim 8, wherein:

the metric definer receives information describing metrics that indirectly specify relationships between component applications; and the relationship definer determines the relationships based on the metrics.

15. A tangible computer-usable storage medium having computer-readable program code stored thereon for causing a computer system to perform a method of enabling the calculation of resource requirements for a composite application, the method comprising:

receiving information describing which component applications are associated with the composite application;

receiving information describing metrics that are to be measured for the component applications;

receiving information describing interrelationships between the component applications associated with the composite application; and receiving information describing rules for calculating the resource requirements for the component applications, wherein the rules are based on the interrelationships between the component applications and the metrics that are to be measured, and wherein at least one of said rules indicates that if a central processing unit utilization metric is below a target level for a particular component application then at least one processor may be de-allocated from the particular component application without negatively impacting performance of the particular component application.

16. The tangible computer-usable storage medium of claim 15, wherein the computer-readable program code embodied therein causes a computer system to perform the method, and wherein the method further comprises:

calculating measurements based on the metrics; and calculating the resource requirements for the component applications based on interrelationships between the component applications and the measurements of the metrics.

17. The tangible computer-usable storage medium of claim 15, wherein the computer-readable program code embodied therein causes a computer system to perform the method, and wherein the method further comprises:

re-calculating the measurements periodically and using the rules to re-recalculate the resource requirements based on re-recalculation of the measurements.

18. The tangible computer-usable storage medium of claim 15, wherein the step of receiving information describing metrics that are to be measured for the component applications further comprises:

receiving metrics selected from a group consisting of:

central processing unit (CPU) utilization, memory utilization, throughput, and amount of data stored on memory.

19. The tangible computer-usable storage medium of claim 15, wherein the computer-readable program code embodied therein causes a computer system to perform the method, and wherein the step of receiving information describing rules further comprises:

receiving the rules in the form of formulas that specify mathematical relationships of a metric to a target value.

20. The tangible computer-usable storage medium of claim 15, wherein the computer-readable program code embodied therein causes a computer system to perform the method, and wherein the method further comprises:

receiving information describing metrics that indirectly specify relationships between component applications; and determining the relationships based on the metrics.

* * * * *